United States Patent [19]

Lenchin et al.

[11] Patent Number: 4,510,166

[45] Date of Patent: Apr. 9, 1985

[54] CONVERTED STARCHES FOR USE AS A FAT- OR OIL-REPLACEMENT IN FOODSTUFFS

[75] Inventors: Julianne M. Lenchin, Cranbury; Paolo C. Trubiano, Somerville; Stella Hoffman, Plainsboro, all of N.J.

[73] Assignee: National Starch and Chemical Corporation, Bridgewater, N.J.

[21] Appl. No.: 572,266

[22] Filed: Jan. 19, 1984

[51] Int. Cl.³ .............................................. A23L 1/195
[52] U.S. Cl. ........................................ 426/565; 426/567; 426/578; 426/579; 426/589; 426/603; 426/613; 426/570; 127/29; 127/30; 127/71; 536/102; 536/103
[58] Field of Search ............... 426/578, 579, 565, 567, 426/603, 570, 589, 661, 613; 127/29, 30, 38, 71; 536/103, 102

[56] References Cited

U.S. PATENT DOCUMENTS

| | | | |
|---|---|---|---|
| 3,769,027 | 10/1973 | Mangiere | 426/578 |
| 3,962,465 | 6/1976 | Richter et al. | 426/48 |
| 3,986,890 | 10/1976 | Richter et al. | 127/38 |
| 4,308,294 | 12/1981 | Rispoli | 426/578 |
| 4,415,599 | 11/1983 | Bos | 426/579 |
| 4,452,978 | 6/1984 | Eastman | 426/578 |

*Primary Examiner*—Jeanette M. Hunter
*Attorney, Agent, or Firm*—Edwin M. Szala; Margaret B. Kelley

[57] ABSTRACT

Converted starches, which with water form gels having a neutral taste and perferably a creamy, smooth consistency, are suitable as fat-and/or oil-replacements in various foodstuffs, especially high fat-and/or oil-containing foodstuffs such as ice cream and mayonnaise.

The starches (e.g., tapioca, corn, or potato) have a DE of less than 5 and their aqueous dispersions have a hot flow viscosity of at least about 10 sec. at 10–50% solids, and they are capable of forming gels having a strength of at least about 25 g. within 24 hrs. and 4° C. at 10–50% solids. The preferred starches are tapioca dextrins having a DE of about 2 or less and hot flow viscosity and gel strength of about 20–100 sec. and 65–930 g. at 25–35% solids. Acid- and enzyme-converted starches are also suitable.

20 Claims, No Drawings

CONVERTED STARCHES FOR USE AS A FAT- OR OIL-REPLACEMENT IN FOODSTUFFS

BACKGROUND OF THE INVENTION

This invention relates to the use of converted starches capable of forming gels as fat- and/or oil-replacements in various foodstuffs.

Over the past few years, heavy emphasis has been placed on the development of fat and/or oil-replacement products for foodstuffs high in fat or oil, such as salad dressings, ice cream and the like. Increased consumer awareness of the calorie content of foods and the recent sharp increase in vegetable oil prices have intensified interest in such replacements.

It is known that most undegraded cereal starches yield dimensionally stable puddings with gel-like properties after gelatinization in water at concentrations of about 5–12% by weight. These same gelling properties are found in potato starches (so-called potato starch flours) which have been slightly modified by suitable chemical treatment.

The main disadvantage of the above starches is the fact that their gels in water are not stable at low temperatures and/or for prolonged storage periods. The gels undergo irreversible conversions on freezing, and the starch has, after defrosting, the form of a water-insoluble spongy mass. When the gels are stored, the high molecular starch components irreversibly associate, forming hydrogen bridge bonds, and the consistency changes to such an extent that the gel becomes hard and repels water. Another disadvantage of native starches is the fact that their aqueous dispersions are too high in viscosity and/or their gel-like preparations have a typical sticky-pasty consistency. They are not suitable for use in foodstuffs that must maintain their shape after spreading or stirring.

Derivatized starches containing functional groups (e.g. carboxymethyl starch or starch phosphates) suffer from the disadvantage that the consistency of their gels in water depends to a great extent on the pH-value. In addition, they are greatly influenced by salts.

The above shortcomings have been overcome by the use of starch hydrolysis-products (SHP) having specific dextrose equivalents (DE), i.e. at least 5% but below 25%, for the formation with water of thermoreversible secondary valence gels (see U.S. Pat. No. 3,962,465 issued June 8, 1976 to M. Richter et al.). These products, also known by the name malto-dextrins, are characterized, not only in terms of their DE, their formation with water of white glossy thermoreversible gels having a neutral taste, a pasty to cutting hard consistency, and a stability to freezing and defrosting, but also by the step-wise enzyme conversion used for their preparation.

As disclosed in U.S. Pat. No. 3,986,890 issued Oct. 19, 1976 to M. Richter et al., SHP-containing mixtures having an average DE of 5–10 also form thermoreversible gels. The admixtures are prepared by combining starch products whose combination have the required DE, the starch products having different degrees of polymerization and differing from each other by at least 10 times, with each of the starch products being branched and at least one being the starch hydrolysis product.

The gels are white, glossy, and thermoreversible. They are stable to freezing and defrosting and have a consistency which can vary from pasty to cutting hard depending upon the amount of water in the gel.

While the above SHP products are satisfactory, their preparation is not convenient. The preparation is carried out by suspending the starch or water-soluble starch derivative in a concentration of 15–50% by weight and the starch-hydrolyzing enzyme bacterial alpha-amylase in a concentration effective to produce the SHP. The pH of the suspension is adjusted to about 7 and the suspension is then heated from 55° to 70° C. in a period of 5–30 minutes, then from 70° to 95°–100° C. in a period of 5–20 minutes, and finally maintained at the latter temperature for 5–20 minutes, whereby a precipitant is formed. The precipitant is separated from the supernatant liquid which is a solution of SHP. SHP may be recovered in solid form by dehydrating the solution. This procedure is not convenient because it requires constant monitoring.

It is therefore desirable to prepare converted (i.e. hydrolyzed) starches having comparable gelling properties but made using simpler procedures that do not require constant monitoring and that preferably permit recovery of the converted starches by more economical procedures.

SUMMARY OF THE INVENTION

The present invention provides converted starches, which with water form gels having a neutral taste and preferably a creamy, smooth consistency, suitable for use as fat- and/or oil-replacements in various foodstuffs. Suitable starches include converted starches (DE of less than 5) whose aqueous dispersions at 10–50% solids have a hot flow viscosity of at least about 10 sec. at 55° C. and are capable of forming gels having a strength of at least 25 g. within 24 hours at 4° C. Particularly suitable starches include converted tapioca, corn and potato starches which have a DE of about 3 or less and a hot flow viscosity and gel strength of about 12–100 seconds and about 50–1000 g. at 10–35% solids. The preferred starches are tapioca starches having a DE of about 2 or less and a hot flow viscosity and gel strength of about 20–100 seconds and about 65–930 g. at 25–35% solids. The most preferred starches are tapioca dextrins having a DE of about 1.5 or less and a hot flow viscosity and gel strength of about 15–80 seconds and about 65–150 g. at 25% solids.

The converted starches are prepared by conventional and convenient procedures, such as dextrinization, acid-conversion, enzyme-conversion, or oxidation, which are described hereafter. Those prepared by acid-conversion or oxidation typically have a dextrose equivalent (DE) of 1 or less. Those prepared by enzyme-conversion or dextrinization have a DE of less than 5, preferably less than 3.

The resulting converted starches thus differ from the SHP of U.S. Pat. Nos. 3,962,465 and 3,986,890 in DE. Even though they do not form gels which are stable to freezing and thawing or which readily melt, they can be used successfully as fat replacements in frozen products such as ice cream or products that require melting such as margarine. When used as a partial replacement (up to about 50%), the gels impart to foodstuffs, such as ice cream, spoonable and pourable salad dressings, margarine, whipped toppings, icings, and sauces, the organoleptic properties comparable to those of the fat- or oil-containing foodstuff. In some foodstuffs they can be used successfully as a total replacement.

DESCRIPTION OF THE PREFERRED EMBODIMENTS

The applicable starch bases which may be used in preparing the converted starches for the use herein as fat- or oil-replacements may be derived from any plant source. These include starches such as corn, potato, sweet potato, wheat, rice, sago, tapioca, waxy maize, sorghum, high amylose starches, and the like.

The starch bases must be converted to be suitable for use herein; however, conversion to the DE levels typical of the SHP products of the above patents is not necessary. Conversion degrades the starch, reduces the viscosity of the cooked starch dispersion, and leads to the formation of gels. Conversion to a DE of less than 5 is sufficient, with the preferred starches having a DE of 2 or less. Converted starches capable of forming firm gels which change in rheology with shear are preferred. The rheological change gives the gel a smooth creamy (i.e. oily or buttery) texture.

The degradation of starches by conversion involves mainly a scission of the starch molecules to lower molecular weight fragments. When this is carried out on a granular starch, the granule structure is weakened. The granules tend to disintegrate more readily and rapidly during the gelatinization process, leading to a lower hot paste viscosity. This viscosity is dependent on the solids content. Starches suitably converted for the use herein will have a hot flow viscosity at 55° C. at least about 10 sec. at a solids content within the range of 10–50%. If the hot dispersion sets up (gels) at 25% solids (the solids content used for most of the determinations herein), the solids should be lowered to a level where the above hot flow viscosity results. If at 5% solids the hot dispersion (55° C.) still sets up, the converted starch is not useful herein.

Suitable converted starches include dextrins, acid-converted starches (referred to as fluidity starches), enzyme-converted starches, and oxidized starches (including chlorinated starches, so named because of the reagent used in their preparation although no chlorine is chemically bound to the starch.

Tapioca dextrins are preferred, with most having a hot flow viscosity within the range of about 20 sec. at 25% solids and about 100 sec. at 35% solids and having a gel strength of about 65 g. at 25% solids and about 930 g. at 35% solids. At 25% solids the gel strength of the preferred tapioca dextrins ranges from about 65–150 g. with the average gel strength being about 113 g. Typical acid-converted tapioca starches have a DE of about 1 or less hot flow viscosity and gel strength of about 10–30 sec. and about 15–20% solids. Typical enzyme-converted tapioca starches have a DE of about 2.5 or less and hot flow viscosity and gel strength of about 15–80 secs. and about 60–250 g. at 25% solids. A typical corn dextrin has a DE of about 1 or less and hot flow viscosity and gel strength of about 15–80 sec. and 80–325 g. at 25% solids, and an acid-converted corn starch has a DE of about 1 or less and hot flow viscosity and gel strength of about 15–80 sec. and 60–250 g. at 10% solids. A potato dextrin having a DE of about 1 or less and hot flow viscosity and gel strength of about 36 sec. and 775 g. at 25% solids is suitable; an enzyme-converted potato starch having a DE of about 2–3 and hot flow viscosity and gel strength of about 12 sec. and 400–1000 g. at 25% solids is also suitable.

In the preparation of the converted starches by dextrinization, the moisture, catalyst (i.e. alkali or typically acid), temperature, and time of the heat reaction are controlled to give the required hot flow viscosity. The four steps of a conventional dextrinization process are acidification, predrying, dextrinization, and cooling. Uniformity of distribution of the acid catalyst is important and preferably a volatile acid is used. The dilute acid is sprayed or atomized into the starch as it is mixed. The starch should contain at least 5% moisture to minimize local specking. Typically, hydrochloric acid (0.05–0.15%) is used, with the amount added being determined by the degree of conversion required. Time is allowed for equilibrium distribution of the sprayed acid throughout the starch. The starch can also be acidified by suspension in an aqueous acidic medium followed by filtration and drying. Gaseous hydrogen chloride can also be added to the dry starch.

Where a hydrolysis reaction is desired initially, moisture must be present and the starch at normal moisture (10 to 18%) may be added directly to the dextrin cooker. In a bulk dextrin cooker it is essential that the starch be heated uniformly and that large temperature gradients throughout the starch be avoided. The heating rate must also be adjusted so that the starch does not char in contact with the heating surfaces.

The dextrin conversion is carried out with close attention to the rate of heating (temperature schedule), the maximum temperature, and total time. Hydrolysis is the major reaction in the initial stage of cooking, and the viscosity is reduced rapidly in this stage to near the level of the finished dextrin. Typically the acidified starch is placed in the drier and heated to a temperature of about 115°–120° C. to lower the moisture content to 3–4%. This usually takes about 3 hrs. The dried starch is then placed in a "cooker" where the dextrinization actually takes place. The temperature can be increased to 160° C., but preferably it is no higher than 145° C., and held until the starch is sufficiently converted to give a dispersion with the required hot flow viscosity. The average time to reach such a degree of conversion is about 4 hrs. with the total time thus being about 7 hrs.

Dextrins can be made from all the commercial starches, the ease of conversion and quality of the dextrins varying with the type and quality of the raw starch. Dextrinization is preferred because recovery of the converted starch is simpler and more economical. The dextrinized starches do not require filtration as do the acid-converted starches or spray-drying as do the enzyme-converted starches. Tapioca starch gives high-quality dextrins. They are easily converted and yield products that give dispersions that form excellent gels with a bland taste, a major factor herein. Potato starch also converts easily to give dextrins with good gelling properties. Corn dextrin dispersions also give suitable gels.

In the preparation of the converted starches by acid treatment, the starch base is hydrolyzed to the required hot viscosity in the presence of an acid, such as sulfuric or hydrochloric acid, at a temperature below the gelatinization point of the starch. The starch is slurried in water, and the acid is then added. Typically, the reaction takes place over a 8–16 hr. period, after which the acid is neutralized with alkali (e.g. to a pH of 5.5), and the starch recovered by filtration. The resulting converted starch (DE of less than 1) will require cooking to gelatinize the starch.

In the preparation of converted starches by enzyme treatment, the starch base is slurried in water, and the pH is adjusted to 5.6–5.7 with alkali or acid. A small amount of alpha amylase enzyme (e.g. about 0.02% on the starch) is added to the slurry, which is then heated above the gelatinization point of the starch. When the desired conversion has been achieved resulting in the required hot flow viscosity, the pH is lowered to about 2.0 with acid to deactivate the enzyme and that pH is maintained for a period of at least 10 minutes. Thereafter the pH may be readjusted upward. The converted starch has a DE of about 1–2. The resulting starch dispersion is usually jet-cooked to ensure complete solubilization of the starch and deactivation of the residual enzyme.

In the preparation of converted starches by oxidation with sodium hypochlorite, an aqueous starch suspension (35–44% solids) is usually treated with sodium hypochlorite solution (containing up to about 2% active chlorine). Typically, the reaction takes place at pH 8–10 and at 21°–38° C. and the reaction mixture is neutralized to pH 5–6.5 when the required hot flow viscosity is reached. The excess oxidant is deestroyed by addition of sodium bisulfite solution or sulfur dioxide. The reaction product is washed to remove impurities, solubilized starch, and by-products of the reaction either on continuous vacuum filters or in hydrocyclones, recovered by filtration, and dried. The resulting converted starch (DE of less than 1) requires further cooking to gelatinize the starch.

If not rendered cold-water-swellable during the conversion process, the converted starches are pregelatinized (i.e. cooked) prior to use. Alternatively, they may be cooked during use, i.e. during the preparation of the foodstuff if the foodstuff requires cooking at a temperature high enough to cook the starch. Spray-dried enzyme-converted starches and some dextrins are cold-water-swellable. The converted starches may be gelatinized by drum-drying starch slurries directly or after cooking (as in a Votator). They may also be jet-cooked and spray-dried. The cooked starch can be dried by means other than spray-drying (e.g. freeze-drying, alcohol precipitation, rotary evaporation). Other means of carrying out the pregelatinization such as extrusion may also be useful herein. The dry, cold-water-dispersible starch can then be incorporated directly into the foodstuff. If desired, the cooked starch slurries can be added directly to the foodstuff or the gels can be allowed to form and the gel added to the foodstuff. The foodstuffs are prepared by conventional procedures and the addition of the converted starch, whether as a slurry, a gel, or in dry form, will depend on the type of foodstuff being prepared.

It will be appreciated that, while the above acid-conversions, oxidations, or dextrinizations are typically carried out on the granular (native) starch, it may be possible to use a slightly modified starch (e.g. a derivatized starch or crosslinked starch that it still capable of forming a gel having the specified strength). Starches which are highly derivatized and/or crosslinked are stable (i.e. their dispersions do not gel). The preferred converted starches herein are not modified.

Suitable derivatives include esters, such as the acetate, and halfesters, such as the succinate and octenylsuccinate, prepared by reaction with acetic anhydride, succinic anhydride, and octenylsuccinic anhydride respectively; phosphate derivatives prepared by reaction with sodium or potassium orthophosphate or sodium or potassium tripolyphosphate; ethers such as hydroxypropyl ether, prepared by reaction with propylene oxide; or any other edible starch derivatives approved for use in food products.

Crosslinked starches, if not too highly crosslinked, can also be used. Crosslinking agents suitable for food starches include phosphorus oxychloride, epichlorohydrin, sodium trimetaphosphate, and adipic acid-acetic anhydride.

The above procedures, i.e., conversion, pregelatinization, derivatization and crosslinking, are conventional and well-known to those skilled in the art and described in such articles as Chapter XXII—"Production and Use of Pregelatinized Starch", Starch: Chemistry and Technology, Vo. III — Industrial Aspects, R. L. Whistler and E. F. Paschall, Editors, Academic Press, New York 1967. Jet-cooking and spray-drying are also conventional and described in U.S. Pat. No. 3,674,555 issued July 4, 1972 to G. R. Meyer et al. The measurement of % reducing sugars (DE) is a conventional laboratory procedure described in any carbohydrate chemistry book.

The following examples will more fully illustrate the embodiments of this invention. In the examples, all parts and percentages are given by weight and all temperatures are in degrees Celsius, unless otherwise noted.

The following test procedures were used to characterize suitably converted starches.

Hot Flow Viscosity (25% solids)

A total of 50.0 g. of the converted starch (anhydrous basis) is weighed into a tared 250 ml. beaker containing a thermometer and brought to 200 g. total weight with distilled water. The slurry is heated to 95° C., held at 95° C. for 10 min., and then cooled to 60° C. It is then brought back to weight with distilled water and cooled to 55° C. A total of 100 ml. of the cooked starch dispersion is measured into a graduated cylinder. It is then poured into a calibrated funnel while using a finger to close the orifice. A small amount is allowed to flow into the graduate to remove any trapped air, and the balance is poured back into the funnel. The graduated cylinder is then inverted over the funnel so that the contents draw (flow) into the funnel while the sample is running. Using a timer, the time required for the 100 ml. sample to flow through the apex of the funnel is recorded.

The glass portion of the funnel is a standard 58°, thick-wall, resistance glass funnel whose top diameter is about 9–10 cm. with the inside diameter of the stem being about 0.381 cm. The glass stem of the funnel is cut to an approximate length of 2.86 cm. from the apex, carefully firepolished, and refitted with a long stainless steel tip which is 5.08 cm. long with an outside diameter of 0.9525 cm. The interior diameter of the steel tip is 0.5951 cm. at the upper end where it is attached to the glass stem; it is 0.4445 cm. at the outflow end, with the restriction in the width occurring at about 2.54 cm. from the ends. The steel tip is attached to the glass funnel by means of a Teflon tube. The funnel is calibrated so as to allow 100 ml. of water to go through in 6 seconds using the above procedure.

Stability Test

This test is used to distinguish stable starches from gelling starches. Cooked starch dispersions containing from 10–50% solids should be capable of forming a gel after standing for 24 hr. at 4° C. The starches are cooked by heating an aqueous slurry containing the starch to 95°–100° C. and maintaining it for 15 minutes before cooling.

Gel Strength

The fluid cook from the above stability test is placed in a 4 oz., short glass jar. The jar is covered and placed in a refrigerator at 4° C. for 16 hrs. At the end of 16 hrs. the jar is removed and allowed to stand at room temperature (25° C.) for 1.5 hr. The gel is then placed in a Stevens LFRA Texture Analyser and the strength of the gel is measured in grams using Plunger No. 5 at a speed of 0.2 mm/sec. and a distance of 4 mm. Suitable gels must have a strength of at least 25 g. The average of 3 readings is used.

EXAMPLE I

This example shows the use of the preferred tapioca dextrin as a fat- or oil-replacement in various foodstuffs.

The pregelatinized dextrin was prepared by heat treating the tapioca starch for 7 hrs. to a maximum temperature of 132° C. using 0.05% hydrochloric acid. The resulting product had a DE of 1.1, and a hot flow viscosity of 22 sec. At 25% solids it formed a firm gel after 24 hours at 4° C., the gel strength being about 113 g. The gel texture was very good, i.e. smooth and buttery.

The dextrin was evaluated in the following foodstuffs at the indicated replacement level and compared to control foodstuffs. An overall rating was given to the replacement foodstuff. This rating was based on the characteristics desired in the particular foodstuff. For example the body, viscosity, texture, spread, gel/set, and sheen, were determined for spoonable salad dressings such as mayonnaise; the dispersibility, smoothness, creaminess, body (i.e. mouthfeel and viscosity), aeration-overrun, meltability, and coatability were determined for ice cream; the smoothness, viscosity, clink, flow, mouth feel, sheen, and coatability were evaluated for pourable salad dressings; the dispersibility, set, texture, sheen, aeration, spread, melt, fry, and mouthfeel were determined for margarine; the dispersibility, aeration, texture, viscosity, body, and spread were determined for whipped toppings; the viscosity, creaminess, spread, mouthfeel, and sweetness were determined for butter cream icings; and the creaminess, smoothness, viscosity, mouthfeel, body, and sheen were determined for white sauces. In all of the foodstuffs, the stability (i.e. lack of crystallization in ice cream, oil separation in the salad dressings or in the other products), blandness, and color were determined.

The oil- and fat-containing foodstuffs were prepared using standard commercial recipes known to those in the art and not included herein. The control foodstuffs were given a rating of 10 and the fat- or oil-replacement foodstuffs were compared with the control using the above determinations to give them an overall rating. The converted tapioca dextrin was incorporated into all preparations as a 25% dispersion (25 parts dextrin/75 parts water), unless otherwise specified, at the indicated replacement level.

TABLE I

| Foodstuff* | % Fat or Oil in Control | Rating | % Fat or Oil in Replacement | Rating |
| --- | --- | --- | --- | --- |
| Mayonnaise | 80% | 10 | 53%/40% | 10/10 |
| Ice Cream | 12% | 10 | 8.4%/6%/0% | 10/8.5/6.5 |
| Buttermilk Salad Dressing** | 50% | 10 | 25% | 10 |
| Creamy Italian Salad Dressing** | 30% | 10 | 0% | 10 |
| Margarine | 80%/40% | 10 | 53%/30% | 8/10 |
| Whipped Topping | 38% | 10 | 25% | 8 |
| Butter Cream | 12.5% | 10 | 6.25% | 10+ |
| White Sauce | 10% | 10 | 6.7%/5.0% | 10/8.5 |

*The ice cream, margarine, whipped topping, butter cream icing, and white sauce contained fat; the mayonnaise and salad dressings contained oil.
**The viscosities of the controls were 6560 and 8500 cps. and those of the replacements were 6800 and 9660 cps. respectively.

The results show that the replacement products were comparable to the controls provided the correct replacement level was selected. In the case of the icing, the replacement product was better in stability. It was even possible to replace all of the oil in the creamy Italian salad dressing and still retain the desired organoleptic properties as well as the coating and clinging properties. In the ice cream the aeration, meltability, and blandness were not as good at higher replacement levels. In the 53% fat margarine the fry, blandness, and color was not as good; in 30% fat margarine the fry was not equivalent but the product was considered acceptable.

EXAMPLE II

This example shows the use of other dextrins in mayonnaise and ice cream. The tapioca dextrins were prepared at a pH of about 3.7 and maximum temperature of about 270°–320° F.; the time to maximum temperature was about 4.5 hours and the total time was about 6¾ to 10 hours. The corn and potato dextrins were prepared in a similar manner.

The characteristics of the dextrins and foodstuffs are indicated in Table II.

TABLE II

| | Dextrin | | | | | |
| --- | --- | --- | --- | --- | --- | --- |
| Base | DE | Solids (%) | Hot Viscosity sec. | Gel Strength g. | Gel Texture | Foodstuff* |
| Tapioca | <1 | 25 | 76 | 242 | hard, pasty | Ice Cream - smooth, creamy, good body Mayonnaise** - short, heavy body |
| Tapioca | N.D | 25 | 66 | 258 | good, firm | Mayonnaise - smooth, short |
| Tapioca | <1 | 25 | 39 | 128 | v. good, buttery | Mayonnaise - smooth, short |
| Tapioca | <1 | 25 | 18 | 86 | buttery | Ice Cream - smooth, creamy, good body |
| Corn | 1 | 25 | 22 | 103 | buttery | Ice Cream - smooth, creamy, good body |
| Potato | <1 | 25 | 36 | 775 | hard, | Mayonnaise - slightly |

TABLE II-continued

| | | Dextrin | | | | |
|---|---|---|---|---|---|---|
| Base | DE | Solids (%) | Hot Viscosity sec. | Gel Strength g. | Gel Texture | Foodstuff* |
| | | | | | pasty | grainy, heavy |

*Replacement at 33% in mayonnaise and 50% in ice cream using 25% starch dispersion.
**Replacement at 50% in mayonnaise using the 25% starch dispersion.
N.D. - not determined.

The results show that various dextrins can be used to produce acceptable products. The tapioca dextrin having 76 sec. hot flow viscosity would have given an acceptable mayonnaise at a lower replacement level. Likewise the potato dextrin would have given an acceptable mayonnaise if used as a 20% starch dispersion.

EXAMPLE III

This example shows the use of various acid-converted starches in mayonnaise or ice cream. The fluidity tapioca starch was prepared by treating starch slurries (40% solids) with 3% concentrated hydrochloric acid for about 16 hr. at 52° C., neutralizing with sodium carbonate, and then washing and air-drying the starches. The starches were cooked prior to use. The acid-converted corn starch was prepared in a similar manner. The characteristics of the product and the foodstuff in which they were used as a replacement are given in Table III.

The results show that acid-converted starches having the required hot flow viscosity and gel strength can be used as oil- and fat-replacement.

EXAMPLE IV

This example shows the use of enzyme-converted starches in mayonnaise at 33% replacement and in ice cream at 50% replacement. The conversions were carried out by rapidly heating an aqueous slurry of starch (20% by weight solids) and alpha-amylase (0.112% by weight on starch solids) in a boiling water bath until the desired conversion (indicated by DE) was reached. The characteristics of these products and a comparative SHP product prepared by the slow enzyme conversion process of U.S. Pat. No. 3,962,465) are given in Table IV.

TABLE IV

| | | Enzyme-Converted Starch | | | | |
|---|---|---|---|---|---|---|
| Base | DE | Solids (%) | Hot Viscosity (sec.) | Gel Strength (g.) | Gel Texture | Foodstuff |
| Potato | 2.1 | 25 | set* | 1000 | dry, slightly pasty | Mayonnaise - short, slightly grainy.** |
| Potato | 3.0 | 25 | 12 | 427 | very buttery, excellent | Mayonnaise*** - smooth, short, heavy body. Ice Cream - smooth, creamy, good body. |
| Tapioca | 2.5 | 25 | 35 | 192 | buttery, slightly soft | Ice Cream*** - smooth, creamy, good body. Mayonnaise - short, smooth. |
| Potato-SHP (comparative) | 5.4 | 25 | 12 | 118 | smooth, buttery | Mayonnaise*** - short, smooth. |

*Set at 25% solids; at lower solids the hot flow viscosity would be acceptable.
**Used in a dispersion at a solids content less than 25% an acceptable product would result.
***Used as a 25% starch solids dispersion.

The results show that enzyme-converted starches having a DE lower than that required for SHP can be used as oil replacements. It also shows that the time consuming, step-wise process of the patent convering SHP is not necessary.

TABLE III

| | | Acid-Converted Starch | | | | |
|---|---|---|---|---|---|---|
| Base | DE | Solids (%) | Hot Viscosity sec. | Gel Strength g. | Gel Texture | Foodstuff |
| Tapioca | <1 | 15 | 16 | 83 | grainy | Mayonnaise* - short, slightly grainy. |
| | | 25 | set | 770 | dry pasty | |
| Corn | <1 | 10 | 26 | 83 | grainy | Mayonnaise** - smooth, short, slightly heavy body |

*When used as a 20% solids solution instead of 25%, the mayonnaise was smooth and almost as good as that of Example I.
**Used as a 25% starch solids dispersion.

Summarizing, this invention is seen to provide lightly converted starches, easily prepared, that are suitable as fat- or oil-replacements in foodstuffs.

Now that the preferred embodiments have been described in detail, various modifications and improvements thereon will become readily apparent to those skilled in the art. Accordingly, the spirit and scope of the invention are to be limited only by the appended claims and not by the foregoing specification.

What is claimed is:

1. A converted gelling starch suitable for use as a fat- and/or oil-replacement in foodstuffs, characterized in that the starch has a dextrose equivalent (DE) of less than 5 and characterized in that aqueous dispersions thereof at 10–50% by weight of starch solids have a hot flow viscosity of at least about 10 seconds at 55° C. and are capable of forming gels having a strength of at least 25 g. within 24 hours at 4° C.

2. The starch of claim 1, wherein the starch is a dextrin, an acid-converted starch, or an enzyme-converted starch.

3. The starch of claim 2, wherein the starch is a tapioca, corn or potato starch.

4. The starch of claim 3, wherein the DE is about 3 or less and wherein the hot flow viscosity and gel strength are about 12–100 secs. and about 50–1000 g. at 10–35% solids.

5. The starch of claim 4, wherein the starch is tapioca starch having the DE of about 2 or less and wherein in hot flow viscosity and gel strength are about 20–100 secs. and 65–930 g. at 25–35% solids.

6. The starch of claim 4, wherein the starch is tapioca dextrin having the DE of about 1.5 or less and wherein the hot flow viscosity and gel stength are about 15–80 secs. and about 65–250 g. at about 25% solids.

7. The starch of claim 6, wherein the starch has a DE of about 1 or less and wherein the hot flow viscosity and gel strength are about 18–76 secs. and about 86–242 g.

8. The starch of claim 4, wherein the starch is an acid-converted tapioca starch having a DE of about 1 or less and wherein the hot flow viscosity and gel strength are about 10–30 secs. and 60–325 g. at about 15–25% solids; or wherein the starch is an enzyme-converted tapioca starch having a DE of about 2.5 or less and wherein the hot flow viscosity and gel strength are about 15–80 secs. and about 60–250 g. at 25% solids.

9. The starch of claim 4, wherein the starch is a corn dextrin having a DE of about 1 or less and wherein the hot flow viscosity and gel strength are about 15–80 secs. and 80–325 g. at 25% solids; or wherein the starch is an acid-converted corn starch having a DE of about 1 or less and wherein the hot flow viscosity and gel strength are about 15–80 secs. and 60–250 g. at about 10% solids.

10. The starch of claim 4, wherein the starch is a potato dextrin having a DE of about 1 or less and wherein the hot flow viscosity and gel strength are about 36 secs. and 775 g. at 25% solids; or wherein the starch is an enzyme-converted potato starch having a DE of about 2–3 and wherein the hot flow viscosity and gel strength are about 12 secs. and 400–1000 g. at 25% solids.

11. An improved fat- and/or oil-containing foodstuff, wherein the improvement comprises the partial or total replacement of the fat and/or oil by an aqueous dispersion of a converted starch, the starch being converted starch having a dextrose equivalent (DE) of less than about 5 and being cooked prior to or during incorporation into the foodstuff, the aqueous dispersion of the cooked starch, at 10–50% by weight of starch solids, having a hot flow viscosity of at least about 10 seconds at 55° C. and being capable of forming a gel having a strength of at least about 25 g. within 24 hours at 4° C.

12. The foodstuff of claim 11, wherein the foodstuff contains up to 80% fat and/or oil and is selected from the group consisting of ice cream, spoonable and pourable salad dressings, margarine, whipped toppings, icings, and sauces, and wherein the starch is a dextrin, an acid-converted starch, or an enzyme-converted starch and the starch is tapioca, corn, or potato starch.

13. The foodstuff of claim 12, wherein the foodstuff is selected from the group consisting of ice cream, spoonable and pourable salad dressings, and margarine, wherein the fat- and/or oil-replacement level is up to about 50%, and wherein the starch has the DE of about 3 or less and the hot flow viscosity and gel strength of about 12–100 secs. and about 50–1,000 g. at 10–35% solids.

14. The foodstuff of claim 13, wherein the foodstuff is selected from the group consisting of ice cream, spoonable and pourable salad dressings, and margarine, wherein the fat- and/or oil-replacement level is about 30–50%, and wherein the starch is tapioca dextrin having the DE of about 2 or less and the hot flow viscosity and gel strength of about 20–100 secs. and 65–930 g. at 25–35% solids.

15. The foodstuff of claim 14, wherein the foodstuff is ice cream and the spoonable salad dressing is mayonnaise and wherein the starch has the DE of about 1.5 or less and the hot flow viscosity and gel strength of about 15–80 secs. and about 65–250 g. at about 25% solids.

16. A method for preparing a low calorie foodstuff, comprising the step of replacing the fat and/or oil in the foodstuff by an aqueous dispersion of a converted starch, the starch being a converted starch having a dextrose equivalent (DE) of less than about 5 and being cooked prior to or during incorporation into the foodstuff, the aqueous dispersion of the cooked starch, at about 10–50% by weight of starch solids, having a hot flow viscosity of at least about 10 seconds at 55° C. and being capable of forming a gel having a strength of at least about 25 g. within 24 hr. at 4° C.

17. The method of claim 16, wherein the foodstuff is a high fat- and/or oil-containing foodstuff selected from the group consisting of ice cream, spoonable and pourable salad dressings, margarine, whipped toppings, icings, and sauces, and wherein the converted starch is the tapioca, corn, or potato starch dextrin or the acid-converted or enzyme-converted tapioca, corn, or potato starch having the DE of about 3 or less with the aqueous dispersions thereof having the hot flow viscosity and gel strength of about 12–100 secs. and about 50–1000 g. at about 10–35% solids.

18. The method of claim 17, wherein the foodstuff contains up to about 80% fat and/or oil and up to 50% of the fat or oil is replaced, wherein the starch is the tapioca dextrin having the DE of about 2 or less with the aqueous dispersions thereof having the hot flow viscosity and gel strength of about 20–100 secs. and about 65–930 g. at about 25–35% solids.

19. The method of claim 18, wherein the starch has the DE of about 1.5 or less with the aqueous dispersions thereof having the hot flow viscosity and gel strength of about 15–80 secs. and 65–250 g. at about 25% solids.

20. The method of claim 19, wherein the starch has the DE of about 1 with the aqueous dispersions thereof having the hot flow viscosity and gel strength of about 18–76 secs. and about 86–242 g.

* * * * *

UNITED STATES PATENT AND TRADEMARK OFFICE
CERTIFICATE OF CORRECTION

PATENT NO. : 4,510,166

DATED : April 9, 1985

INVENTOR(S) : Julianne M. Lenchin, Paolo C. Trubiano, and Stella Hoffman

It is certified that error appears in the above-identified patent and that said Letters Patent are hereby corrected as shown below:

Column 7, line 35, rewrite "clink" as --cling--.

Signed and Sealed this

Eighth Day of October 1985

[SEAL]

Attest:

DONALD J. QUIGG

Attesting Officer

Commissioner of Patents and Trademarks—Designate

UNITED STATES PATENT AND TRADEMARK OFFICE
CERTIFICATE OF CORRECTION

PATENT NO. : 4,510,166
DATED : April 9, 1985
INVENTOR(S) : Julianne M. Lenchin, Paolo C. Trubiano and Stella Hoffmann It is certified that error appears in the above-identified patent and that said Letters Patent are hereby corrected as shown below:

On the front page, line [75], delete "Hoffman", add

- - Hoffmann - -.

Signed and Sealed this

Twenty-ninth Day of October 1985

[SEAL]

Attest:

Attesting Officer

DONALD J. QUIGG

Commissioner of Patents and Trademarks—Designate